US008210848B1

(12) United States Patent
Beck et al.

(10) Patent No.: US 8,210,848 B1
(45) Date of Patent: Jul. 3, 2012

(54) METHOD AND APPARATUS FOR DETERMINING USER FEEDBACK BY FACIAL EXPRESSION

(75) Inventors: Alexander John Gray Beck, Frenchs Forest (AU); Colin Blair, Westleigh (AU); Andrew W. Lang, Epping (AU); Paul Thomas McNamara, Killarney Heights (AU); Paul Roller Michaelis, Louisville, CO (US); David Preshan Thambiratnam, Ashfield (AU); James K. Wan, Carlingford (AU)

(73) Assignee: Avaya Inc., Basking Ridge, NJ (US)

( * ) Notice: Subject to any disclaimer, the term of this patent is extended or adjusted under 35 U.S.C. 154(b) by 1774 days.

(21) Appl. No.: 11/074,428

(22) Filed: Mar. 7, 2005

(51) Int. Cl.
*G09B 21/00* (2006.01)
*G06K 9/03* (2006.01)

(52) U.S. Cl. .................. 434/112; 382/307; 382/311

(58) Field of Classification Search .......... 434/112–117; 382/308, 311
See application file for complete search history.

(56) References Cited

U.S. PATENT DOCUMENTS

| 6,062,863 | A  | * | 5/2000  | Kirksey et al. | ............... | 434/169 |
| 6,813,395 | B1 | * | 11/2004 | Kinjo          | ............... | 382/305 |
| 7,027,054 | B1 | * | 4/2006  | Cheiky et al.  | ............... | 345/473 |
| 2004/0106449 | A1 | * | 6/2004 | Walker et al.  | ............... | 463/25  |
| 2004/0143430 | A1 | * | 7/2004 | Said et al.    | ............... | 704/2   |
| 2004/0223649 | A1 | * | 11/2004 | Zacks et al.  | ............... | 382/218 |

* cited by examiner

*Primary Examiner* — Michael Cuff

(74) *Attorney, Agent, or Firm* — John C. Moran

(57) ABSTRACT

A method and apparatus provide feedback of facial expressions of participants during communication by capturing facial expressions of participants; extracting facial information from the captured facial expressions; transmitting the extracted facial information to communication terminals; and displaying the transmitted facial information by the communication terminals in a symbolic form.

2 Claims, 6 Drawing Sheets

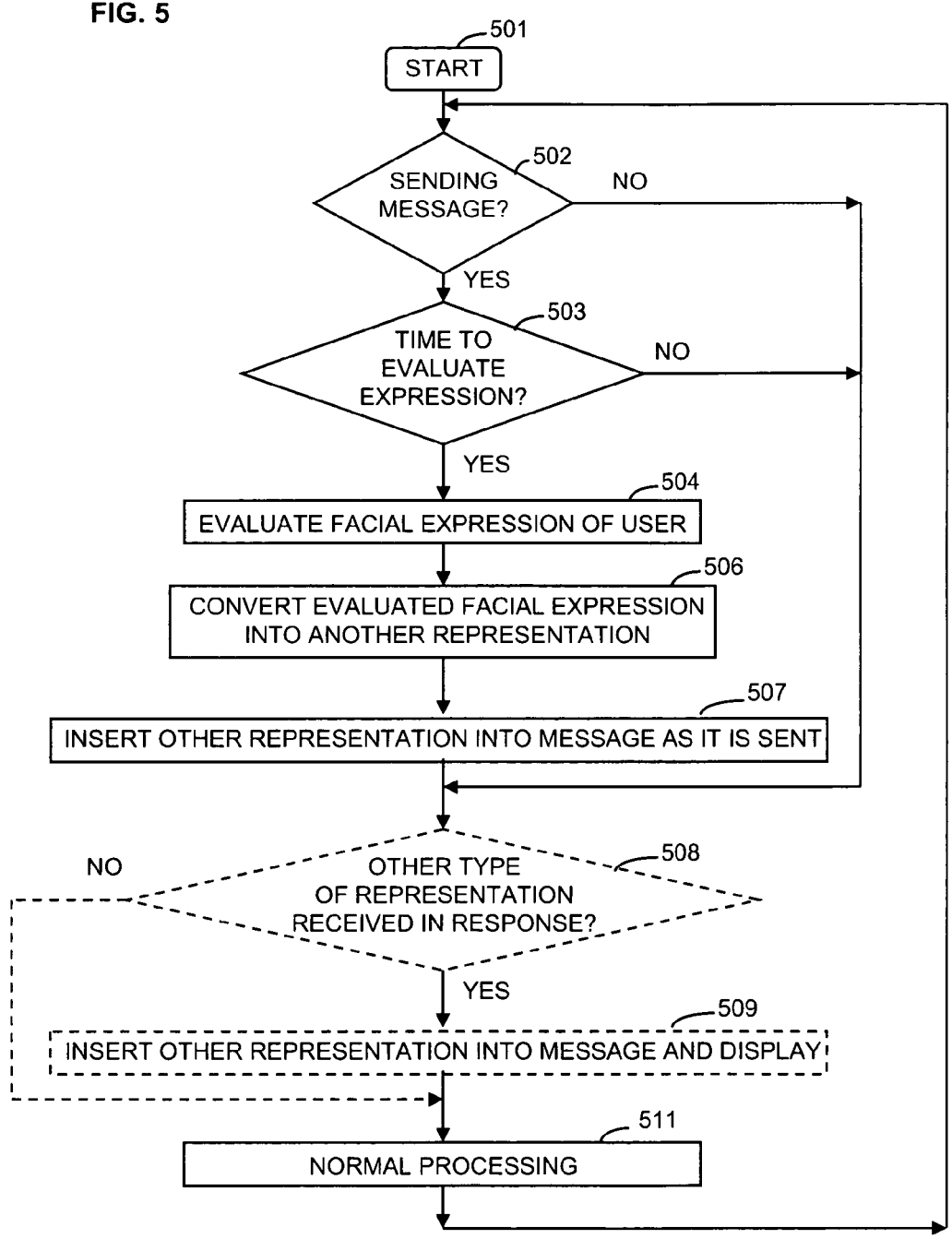

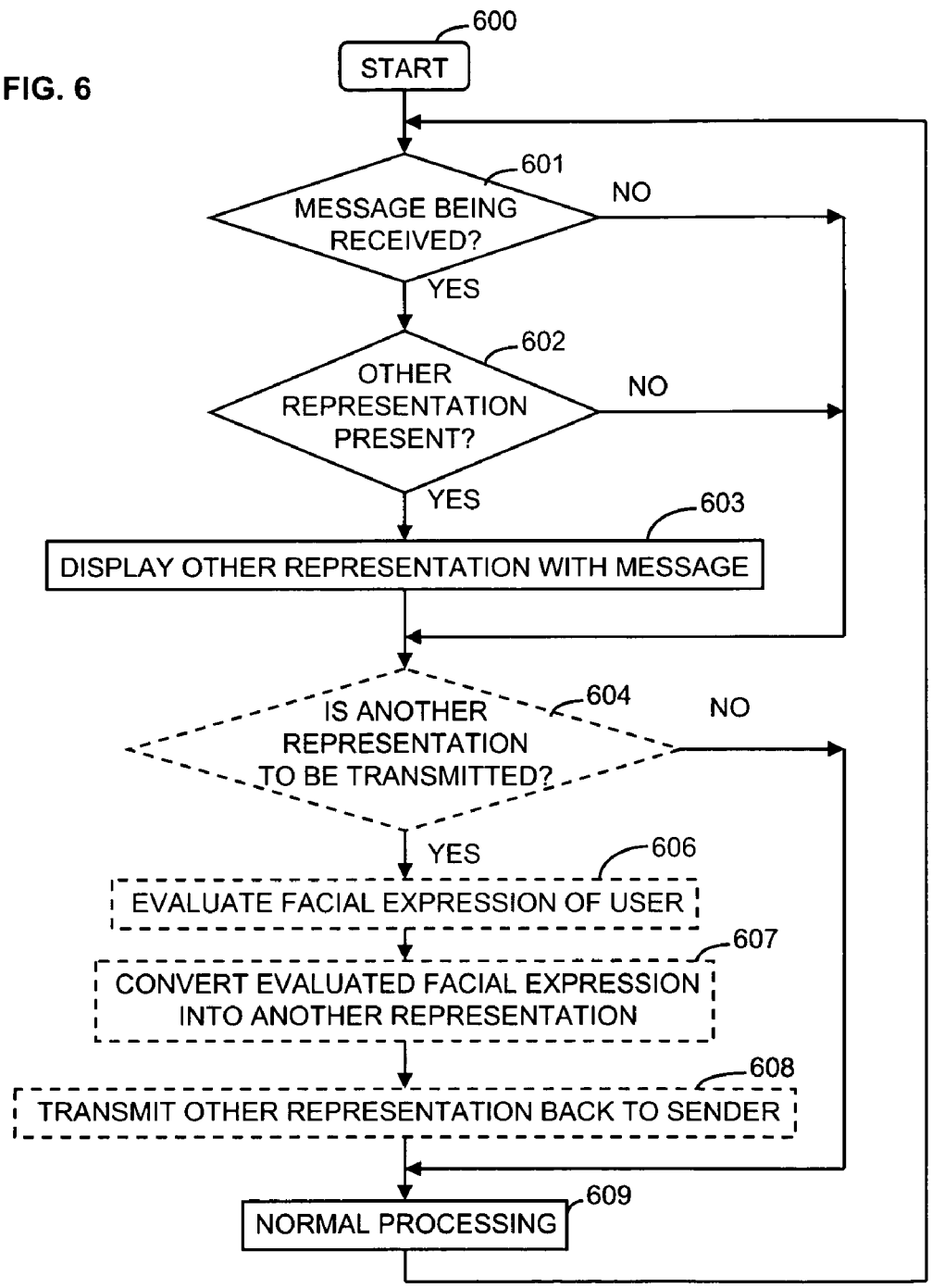

METHOD AND APPARATUS FOR DETERMINING USER FEEDBACK BY FACIAL EXPRESSION

TECHNICAL FIELD

This invention relates to the communication of facial information.

BACKGROUND OF THE INVENTION

During interpersonal exchanges, the facial expressions of people can reveal what they are thinking. For this reason, it has been commonly assumed that the chief benefit of video teleconferencing is that it allows conference participants to see the person who is speaking. However, research at the Johns Hopkins University and at Bell Laboratories in the mid-1970's failed to demonstrate that there is a significant benefit to seeing the person who is speaking—perhaps one of the reasons why two-way "picture telephone" systems never achieved the market penetration that had been predicted for them. By contrast, research has demonstrated that a tremendous advantage of video teleconferencing versus audio only is that it provides a feedback mechanism by which participants may judge the reactions of other participants to a speaker's message. Unfortunately, individuals with impaired vision can not discern the facial expressions of people during a video teleconference. This puts them at a disadvantage compared to the other participants in the video teleconference.

Within the art, the utilization of instant messaging, IM, and short-messaging signaling, SMS, has slowly started to replace voice communication. Unfortunately, these messages tend to be quite terse and consequently can be misunderstood. Within the realm of IM messages, it is known to select manually a cartoon character—commonly referred to as an "emoticon"—to indicate the mood of the sender. The cartoon character is then included as part of the IM message. Unfortunately, the selection of the cartoon character is left to the discretion of the sender and in addition, the sender has to include it. If the sender is in a hurry, the sender will often neglect to send the cartoon character indicating the emotional state of the sender.

SUMMARY OF THE INVENTION

A method and apparatus provide feedback of facial expressions of participants during communication by capturing facial expressions of participants; extracting facial information from the captured facial expressions; transmitting the extracted facial information to communication terminals; and displaying the transmitted facial information by the communication terminals in a symbolic form.

BRIEF DESCRIPTION OF THE DRAWING

FIG. 5 illustrates, in flowchart form, operations of an embodiment of a terminal that is transmitting a text message; and FIG. 6 illustrates, in flowchart form, operations of an embodiment of a terminal that is receiving a text message.

DETAILED DESCRIPTION

In one embodiment for a video conference, the facial expressions of the participants are analyzed to determine their facial information. The results of this analysis are then outputted in a symbolic form so that a visually impaired individual can have feedback concerning the facial reactions of the other participants. The symbolic form is not a photographic image. The symbolic form may be a cartoon, caricature, text, audio, color, visual emoticon or tactilely discernible form, or other symbolic forms known to those skilled in the art. A visually impaired individual with limited visual may be able to utilize color information. In another embodiment, the visually impaired individual only gets feedback from the person who is speaking at any given point in time. In yet another embodiment, the visually impaired individual can choose from which person they will receive the facial expression feedback. Also in an embodiment, the facial information indicates the emotion of a person. In another embodiment, a person using a regular telephone is also given feedback.

In another embodiment for a messaging system, the facial information of a sender of a message is determined and the results of this determination are included in the message when it is transmitted to a destination. In one embodiment, the facial information determined from the facial expression is utilized to select a symbolic form such as a cartoon character or another representation that is included in the message. The symbolic form may be a cartoon, caricature, text, audio, color, or visual emoticon, or other symbolic forms known to those skilled in the art. For example, if the sender was happy, then a cartoon character may show a smiling face. In another embodiment, the facial information is determined from facial expressions during the time that the sender is composing the message, and a series of cartoon characters or other representations are inserted in the message either periodically or when the expression on the sender's face changes. In another embodiment, the facial information of the receiver is determined from facial expressions as the reader reads the message, and this information is transmitted back to the sender where it is inserted into the document that the sender transmitted to the receiver. In yet another embodiment, only one cartoon character or another representation is transmitted back to the sender which is simply a summary of the facial information expressed by facial expressions of the receiver.

In still another embodiment, an individual whose facial information is going to be transmitted is given an opportunity to review and edit their automatically generated facial information before it is transmitted.

Figure 1:
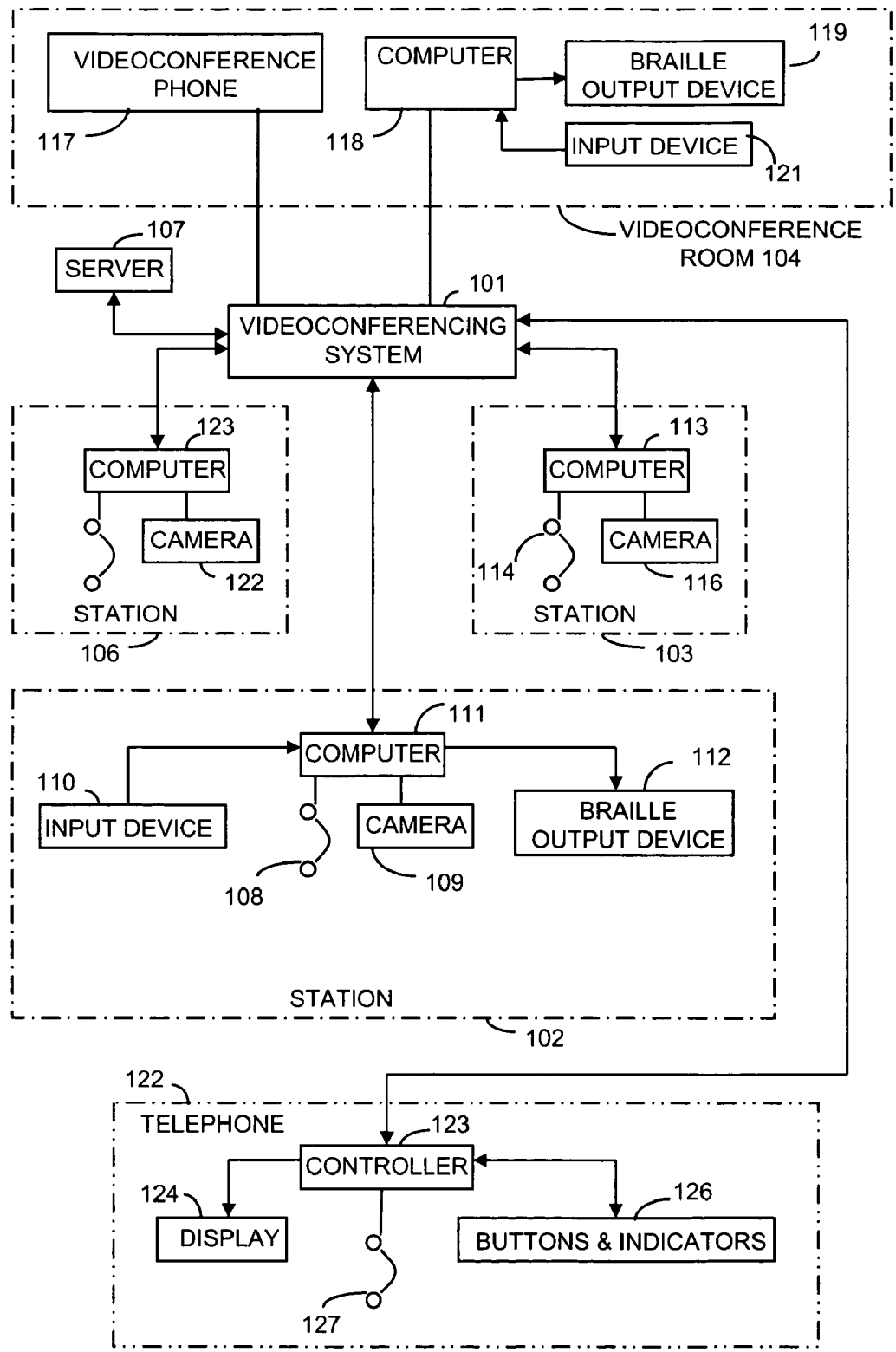
FIG. 1 illustrates, in block diagram form, an embodiment for implementing a video teleconferencing environment.

FIG. 1 illustrates, in block diagram form, an embodiment for implementing video conferencing while providing symbolic facial information based output for a visually impaired person. In addition, a person utilizing telephone 122 may also receive symbolic facial information based output from conferencing system 101. This information could be displayed on display 124, an indicator of buttons and indicators 126 or provided as an audio output to the user of telephone 122. In addition, server 107 could provide this information to telephone 122. Participants in the video conference can utilize video conference room 104 or stations 102, 103, and 106. Video conferencing system 101 performs the video conferencing operations. Systems such as video conferencing system 101 are well known by those skilled in the art.

A visually impaired individual can participate in the conference utilizing station 102. At station 102, a visually impaired individual receives the results of the automatic analysis of facial expressions of other conference participants on Braille output device 112. This Braille output may be in the form of a tactilely discernible emoticon or other Braille output well known to those skilled in the art. In another embodiment, the visually impaired person receives the facial information output via audio information on audio unit 108. In addition, a visually impaired individual in video conference room 104 would utilize Braille output 119 device that is controlled by computer 118.

During the video conference, a visually impaired individual utilizing station 102 could utilize input device 110 to determine which of the other participants in the conference they want to receive symbolic facial information. Similarly, a visually impaired person in video conference room 104 would utilize input device 121. Computers 111 and 118 analyze the video information being received from the selected participants to determine the facial information of these participants. Computers 111 and 118 then utilize Braille output devices 112 and 119, respectively, to present this facial information to the visually impaired participant or they utilize an audio transducer to inform the visually impaired individual of the facial information of the selected participants.

In another embodiment, server 107 performs the automatic analysis of facial expressions to determine the facial information of the different participants. Server 107 then transmits the results of the automatic analysis to computer 111 or 118 which in turn presents the information to the visually impaired individual.

Video conference phone 117 is well known to those skilled in the art and is utilized to gather audio and video information from the participants in video conference room 104 and transmit this to video conferencing system 101 as well as to receive audio and video information from video conferencing system 101 and present this to the participants in video conference room 104.

Cameras 109, 116, and 122 are utilized by computers 111, 113, and 123 of stations 102, 103, and 106, respectively, to obtain video information from the participant utilizing each of these stations.

Utilizing input device 110, a visually impaired individual can inform computer 118 which of the participants the facial information should be received from.
Computer 111 is then responsive to select the proper video image for facial expression analysis so as to arrive at the facial information of the selected participant or participants. Computers 113 and 123 use similar input devices to allow similar selections. Braille output devices need not present the facial information via traditional Braille text; they could also present information in non-text formats, such as tactilely discernible emoticons. Braille output devices 112 and 119 may be AlvaBraille Terminal from HumanWare, Inc., KTS Braillotherm from American Thermoform Corporation or similar devices.

An individual utilizing telephone 122 which does not have video capability can also participate in the video conference and receive the results of the automatic analysis of facial expressions of the other conference participants via either audio information which is only sent to the audio transducer 127 or is displayed as alpha-numeric information on display 124 or one of the indicators of buttons and indicators 126. The individual using telephone 122 can select which of the participants to receive the facial information from by the utilization of buttons on buttons and indicators 126. In one embodiment, server 107 performs the automatic analysis of facial expressions to determine the facial information of the different participants. Server 107 then transmits the results of the automatic analysis to controller 123 which displays the information on display 124 or as audio information on audio transducer 127. In another embodiment, video conferencing system 101 would perform the automatic analysis of the facial expressions and transmits this information to controller 123. In yet another embodiment, controller 123 would receive the video information from video conferencing system 101 and perform the automatic analysis of the facial expressions.

Figure 2:
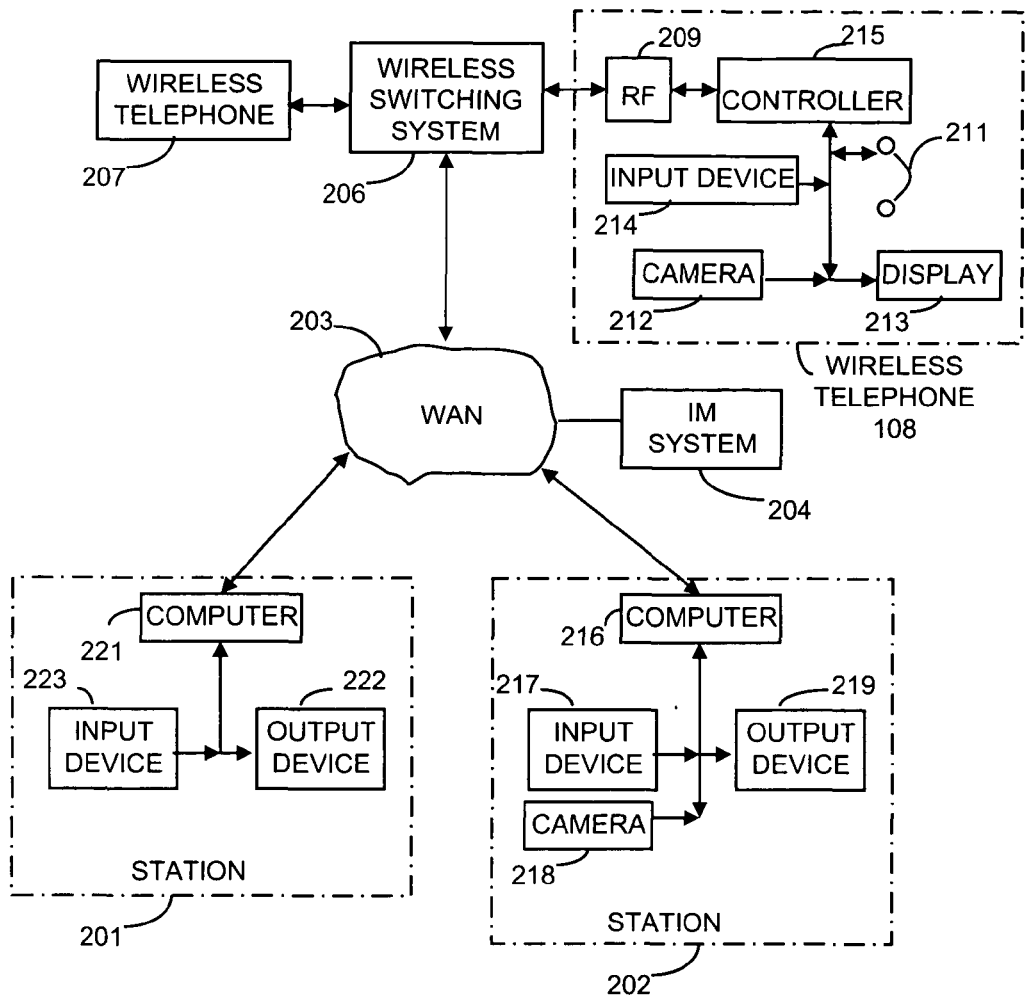
FIG. 2 illustrates, in block diagram form, an embodiment for implementing a messaging environment.

FIG. 2 illustrates embodiments for gathering the facial information of a sender of a message by analysis of the facial expression of the sender. If a user of station 202 wishes to send an IM message via WAN 203 and IM system 204 to the user of station 201, the user of station 202 utilizes input device 217 to input the message. While the user of station 202 is inputting the message, camera 218 takes a series of video images of the user's face. These video images are then analyzed by computer 216 to determine the facial information from the facial expressions of the user. Computer 216, on the basis of this analysis, then selects a cartoon figure to include with the message before transmission to station 201. Upon receipt of the IM message at computer 221, the latter computer then outputs this message, including the cartoon figure, on output device 222. In another embodiment, the facial information is not encoded into a cartoon figure but rather is encoded as color and the message is displayed in that color. In another embodiment, the facial information is utilized to select a musical tune on station 201 indicating the facial information of the sender of the message.

If the user of wireless telephone 208 wishes to send a SMS message to the user of wireless telephone 207 via wireless switching system 206, the user of wireless telephone 208 utilizes input device 214 to enter the content of the SMS message. Controller 215 then uses video images being received from camera 212 to determine from the facial expressions of the user their facial information while creating the message. Controller 215 then includes an indication of this facial information in the SMS message that is transmitted to wireless telephone 207. The indication that controller 215 selects to indicate the facial information of the user of wireless telephone 208 may be at least one of the following: a cartoon character, a color, or a musical tune. Controller 215 utilizes RF circuit 209 for communications with wireless switching system 206.

As is well known in the art, SMS messages can be transmitted to IM system 204 by wireless switching system 206 via WAN 203 for transmission to a station such as stations 201 or 202.

Figure 3:
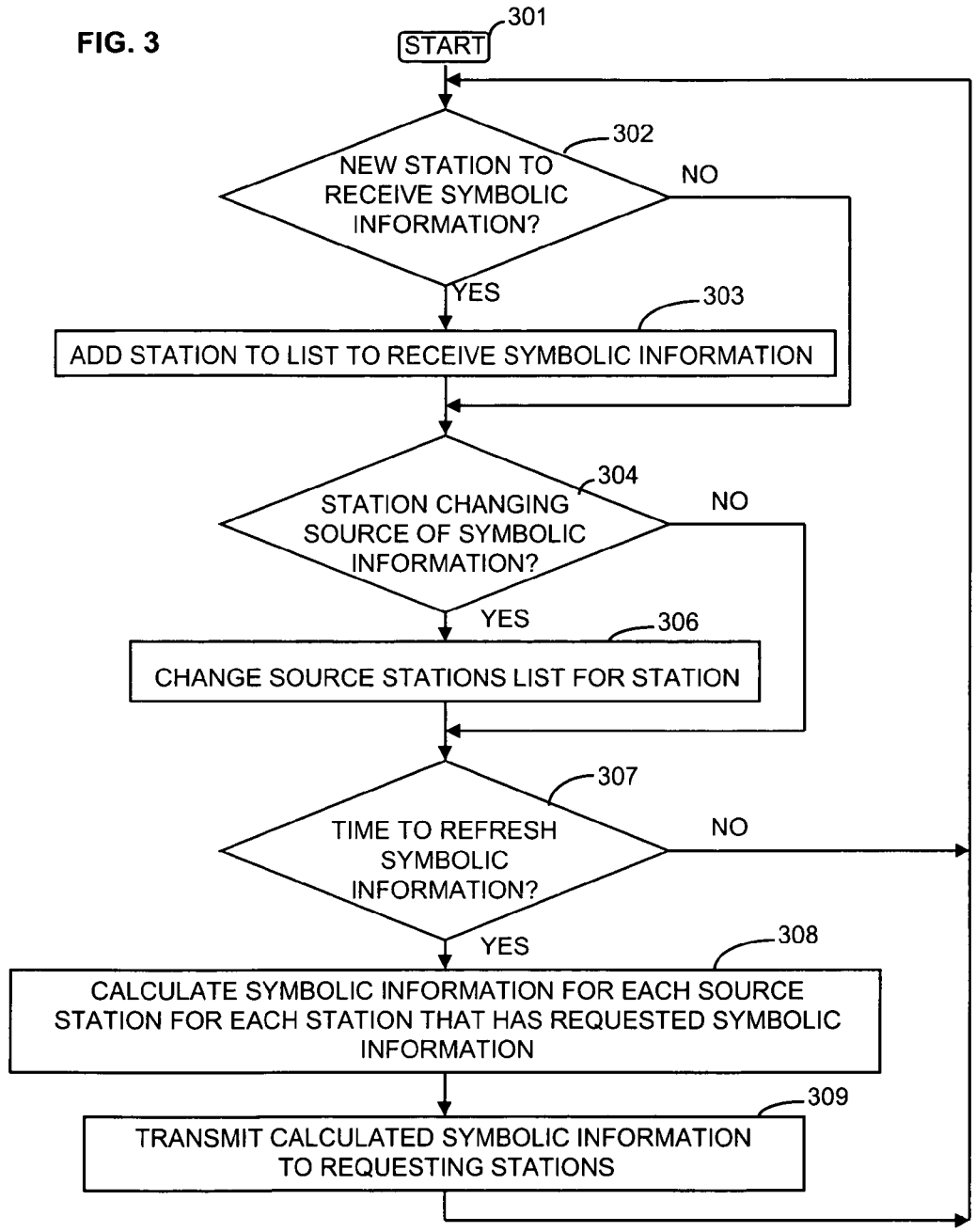
FIG. 3 illustrates, in flowchart form, operations of an embodiment of a central station that is evaluating visual information to determine symbolic information.

FIG. 3 illustrates, in flowchart form, operations performed by an embodiment of a central system such as video conferencing system 101 or server 107 of FIG. 1 in implementing one embodiment. In this embodiment, the central system is generating the symbolic information representing the visual expressions of the participants in a video conference call and transmitting this symbolic information to requesting stations. After being started in block 301, decision block 302 determines if a new station that is part of the video conference is requesting symbolic information. If the answer is no, control is transferred to decision block 304. If the answer is yes in decision block 302, block 303 adds the requesting station to the list of stations that are to receive symbolic information before transferring control to decision block 304.

Decision block 304 determines if a station that has requested to receive symbolic information is changing the source station of that symbolic information. If the answer is no, control is transferred to decision block 307. If the answer in decision block 304 is yes, block 306 changes the source station's list for the station requesting the change in source station before transferring control to decision block 307.

Decision block 307 determines when it is time to refresh the symbolic information that is to be transmitted to the requesting stations. If the answer is no in decision block 307, control is transferred back to decision block 302. If the answer is yes in decision block 307, block 308 calculates the symbolic information for each of the source stations for each requesting station. Then, block 309 transmits the calculated symbolic information to the requesting stations before transferring control back to decision block 302. In another embodiment, decision block 307 determines if there is a change in facial information.

Figure 4:
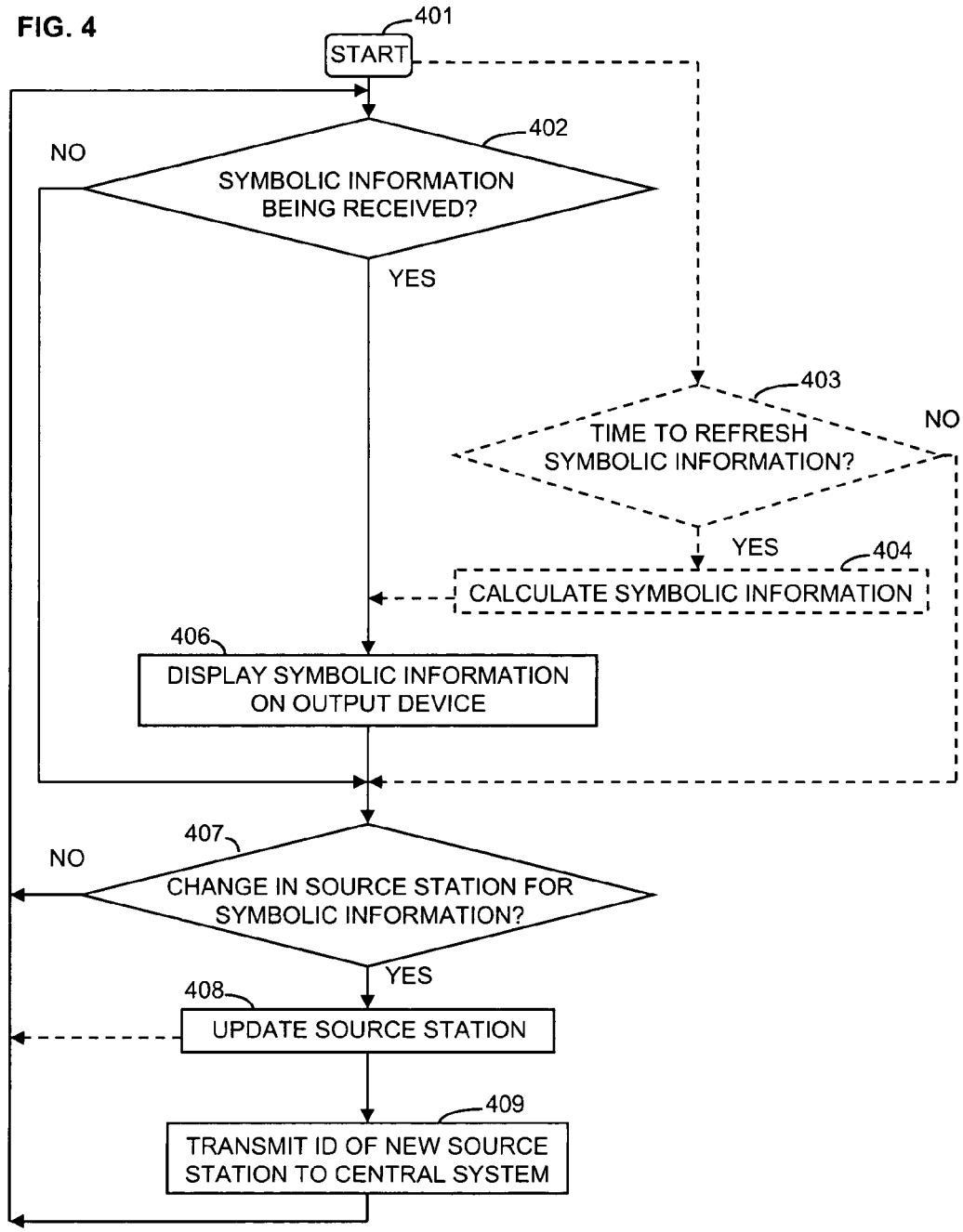
FIG. 4 illustrates, in flowchart form, operations of an embodiment of a station that is participating in a video teleconference.

FIG. 4 illustrates, in flowchart form, operations of an embodiment of a station that is utilizing symbolic information to display the visual information that is part of a video conference call. Such an embodiment could be utilized by station 102 or station 122. In FIG. 4, the dashed lines and blocks are the operations preformed when the station is generating the symbolic information from the visual information being received from the video conference call. Blocks 403 and 404 illustrate the operations performed when the station is calculating or generating the symbolic information. After being started in block 401, control is transferred to decision block 402 if a central system is calculating the symbolic information. Decision block 402 determines if new symbolic information has been received from the central system. If the answer is no, control is transferred to decision block 407. If the answer is yes in decision block 402, block 406 displays the symbolic information on the output device that is being utilized for this purpose. If the station itself is calculating the symbolic information, control is transferred from block 401 to decision block 403. The latter decision block determines if it is time to refresh the symbolic information. If the answer is no, control is transferred to decision block 407. If the answer is yes in decision block 403, block 404 calculates the symbolic information before transferring control to block 406.

Decision block 407 determines if the user of the station has changed or added a source station from which the symbolic information is to be calculated. If the answer is no, control is transferred back to decision block 402. If the answer is yes in decision block 407, block 408 updates the source station information. If the station is calculating the symbolic information then, after execution of block 408, control is transferred back to decision block 402. If a central system is calculating the symbolic information, control is transferred from block 408 to block 409 which transmits the identification of the new source station to the central system before transferring control back to decision block 402.

FIG. 5 illustrates, in flowchart form, operations performed by an embodiment of a station of FIG. 2. After being started in block 501, decision block 502 determines if the station is sending a message. If the answer is no, control is transferred to decision block 508 in one embodiment and to block 511 in another embodiment. The operations illustrated in dash lines in blocks 508 and 509 are operations performed in an embodiment where the receiving station will transmit back converted facial expressions to let the sender know the receiver's response to the transmitted message. If the answer is yes in decision block 502, decision block 503 determines if it is time to evaluate the expression. If the answer is no, control once again is transferred to decision block 508 or block 511. If the answer in decision block 503 is yes, block 504 evaluates the facial expression of the user and block 506 converts the evaluated facial expression into another representation. The other representation may be used to output information on a Braille output device or sound device or change the color of the message being sent. Finally, block 507 inserts the other representation into the message as the message is being sent.

If the decision block 508 is present, this decision block determines if another type of representation is being received in response to a message that was sent or is currently being sent. If the answer is no, control is transferred to block 511. If the answer is yes in decision block 508, block 509 inserts the other representation into the message and displays the result before transferring control to block 511. Block 511 performs normal processing before returning control back to decision block 502.

FIG. 6 illustrates, in flowchart form, operations performed by an embodiment of a station that is receiving a message. After being started in block 600, decision block 601 determines if a message is being received. If the answer is no, control is transferred to decision block 604 or in another embodiment to block 609. In the first embodiment, blocks 604-608 are utilized to transmit back to the original sending station a response as determined by the facial expression of the user of the station that is receiving a message and are illustrated by dashed lines. If the answer in decision block 601 is yes, decision block 602 determines if another representation is present in the message. If the answer is no, control is transferred to decision block 604 or block 609. If the answer is yes in decision block 602, block 603 displays the other representation with the message.

Decision block 604 determines if another representation is to be transmitted from the station back to the original sending station. If the answer is no, control is transferred to block 609. If the answer is yes in decision block 604, block 606 evaluates the facial expression of the user, and block 607 converts the evaluated facial expression into another representation. Block 608 transmits the other representation back to the sender of the original message. Block 609 performs normal processing before returning control back to decision block 601.

When the operations of the stations, servers, or systems are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The software can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory)

(electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where the stations, servers, or systems is implemented in hardware, the stations, servers, or systems can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above would be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for feedback of facial expressions of participants during communication, comprising:

capturing facial expressions of participants;

extracting facial information from the captured facial expressions;

reviewing by a participant whose extracted facial information is to be transmitted the extracted facial information before transmission;

editing by the participant the extracted facial information before transmission;

transmitting the extracted facial information to communication terminals; and displaying the transmitted facial information by the communication terminals in a symbolic form.

2. A processor-readable medium for feedback of facial expressions of participants during communication, comprising processor-executable instructions configured for:

capturing facial expressions of participants;

extracting facial information from the captured facial expressions;

reviewing by a participant whose extracted facial information is to be transmitted the extracted facial information before transmission;

editing by the participant the extracted facial information before transmission;

transmitting the extracted facial information to communication terminals; and displaying the transmitted facial information by the communication terminals in a symbolic form.

* * * * *